US006450312B1

(12) United States Patent
Hsiao

(10) Patent No.: US 6,450,312 B1
(45) Date of Patent: Sep. 17, 2002

(54) EASILY DIRECTION-CONVERTIBLE RATCHET ASSEMBLY FOR A HAND TOOL

(76) Inventor: Chieh-Jen Hsiao, 2F, No. 215, Yu-Te Rd., Pei Dist., Taichung City (TW)

( * ) Notice: Subject to any disclaimer, the term of this patent is extended or adjusted under 35 U.S.C. 154(b) by 26 days.

(21) Appl. No.: 09/794,733

(22) Filed: Feb. 27, 2001

(51) Int. Cl.[7] .......................... F16D 43/00; F16D 41/18; B25B 15/04

(52) U.S. Cl. ........................ 192/43.2; 192/43.1; 81/63.1

(58) Field of Search ................................ 192/43.1, 43.2; 81/63.1

(56) References Cited

U.S. PATENT DOCUMENTS

| | | | | |
|---|---|---|---|---|
| 5,379,873 A | | 1/1995 | Shiao | |
| 5,609,078 A | * | 3/1997 | Yang | 81/63.1 |
| 5,749,272 A | * | 5/1998 | Phan | 81/62 |
| 6,047,802 A | * | 5/2000 | Huang | 192/43.2 |
| 6,206,160 B1 | * | 3/2001 | Chen | 192/43.2 |
| 6,314,838 B2 | * | 11/2001 | Wall | 81/58.4 |
| 6,330,843 B1 | * | 12/2001 | Lin | 81/63.1 |

* cited by examiner

*Primary Examiner*—Rodney H. Bonck
*Assistant Examiner*—Eric M Williams
(74) *Attorney, Agent, or Firm*—Merchant & Gould P.C.

(57) ABSTRACT

A ratchet assembly includes a mounting body with an inner tubular hole, a rotating shaft with a ratchet wheel which is received in the tubular hole and which has right and left toothed portions, and right and left pawl members disposed in right and left chambers of the tubular hole and each having a pawl body which is movable to respectively engage or disengage the right and left toothed portions. An actuator is mounted on and is shifted relative to the mounting body between a normal position, where the actuator releases one pawl member to engage the respective toothed portion so as to turn the rotating shaft in a clockwise direction, and depresses the other pawl member to disengage the respective toothed portion, and a reverse position, where the actuator releases the other pawl member to engage the respective toothed portion so as to turn the rotating shaft in a counter-clockwise direction.

9 Claims, 10 Drawing Sheets

EASILY DIRECTION-CONVERTIBLE RATCHET ASSEMBLY FOR A HAND TOOL

BACKGROUND OF THE INVENTION

1. Field of the Invention

This invention relates to a ratchet assembly, more particularly to an easily direction-convertible ratchet assembly for a hand tool.

2. Description of the Related Art

An example of conventional ratchet screwdrivers has been disclosed in U.S. Pat. No. 5,379,873 and comprises an elongated housing which has an axially extending cavity that receives a drive shaft with a ratchet wheel, and an axially extending peripheral slot that is confined by two opposing vertical walls. The housing is further formed with a horizontal bridge surface and an inclined support face so as to support two ratchet pawls when two finger portions of the ratchet pawls engage the ratchet wheel. However, only the finger portions engage the ratchet wheel to transmit the torque force of the housing to the drive shaft, thereby resulting in a limited torsional force transmission capability.

Another example of the conventional ratchet screwdriver includes a mounting body, two spring-biased ratchet pawls which are received in the mounting body, and a rotating shaft which has a front end adapted to engage a screwdriver and a rear annular end with an internally toothed portion that is sleeved on the mounting body to engage one of the ratchet pawls. An adjusting ring is sleeved on the mounting body adjacent to the ratchet pawls to depress or release the ratchet pawls so as to convert the rotating directions of the mounting body for transmission to the rotating shaft. It is inconvenient to operate the aforesaid ratchet screwdriver since the user requires both hands to rotate the adjusting ring and the mounting body. In addition, the size of the ratchet screwdriver is increased due to inclusion of the adjusting ring.

SUMMARY OF THE INVENTION

The object of the present invention is to provide an easily direction-convertible ratchet assembly that is capable of overcoming the aforementioned drawbacks.

According to this invention, the ratchet assembly includes a mounting body, a rotating shaft, a ratchet wheel, right and left pawl members, an actuator, and a biasing member. The mounting body includes front and rear portions opposite to each other in a longitudinal direction, and an intermediate portion interposed therebetween. The rear portion is adapted to be secured to and is rotatable with a handle when the handle is turned by a torque force. The front portion includes a front end wall which extends in a first plane facing toward the longitudinal direction, and has an inner tubular hole which extends rearwards into the intermediate portion so as to form an inner surrounding wall surface that surrounds a rotating axis parallel to the longitudinal direction. The inner surrounding wall surface has upper and lower areas opposite to each other in a first transverse direction transverse to the longitudinal direction. The inner tubular hole is divided by a central plane, which passes through the rotating axis and which is parallel to both the longitudinal direction and the first transverse direction, into right and left chambers. The rotating shaft is adapted to be rotated with a drive shaft about the rotating axis, and includes proximate and distal portions relative to the drive shaft. The distal portion is inserted in the inner tubular hole along the rotating axis. The ratchet wheel is mounted on the distal portion so as to be rotated about the rotating axis, and includes right and left half tooth portions which are respectively located in the right and left chambers. The right and left pawl members are respectively disposed in the right and left chambers. Each of the right and left pawl members includes a pushed stem which has an actuated end that movably extends upwardly and into the upper area and outwardly of the intermediate portion, and a coupling end that extends downwardly from the actuated end in the first transverse direction, and a pawl body which is disposed on the coupling end, and which includes a pawl engaging surface that is disposed to face upwards and in the first transverse direction and that is movable toward and away from a respective one of the right and left tooth portions, thereby engaging and disengaging the same, and an abutting surface opposite to the pawl engaging surface in the first transverse direction. The actuator is mounted on and is shiftable relative to the mounting body between normal and reverse positions. In the normal position, the actuator releases one of the actuated ends of the right and left pawl members to permit the respective pawl engaging surface to move upwards so as to engage a respective one of the right and left tooth portions, thereby transmitting the torque force from the rear portion to the respective one of the right and left tooth portions so as to turn the rotating shaft in a clockwise direction, while the actuator depresses the other actuated end to move the respective pawl engaging surface to disengage the other one of the right and left tooth portions so as not to interfere with the transmission of the torque force. In the reverse position, the actuator releases the other actuated end to permit the respective pawl engaging surface to move upwards so as to engage the other one of the right and left tooth portions, thereby transmitting the torque force from the rear portion to the other one of the right and left tooth portions so as to turn the rotating shaft in a counterclockwise direction. The biasing member is disposed to bias the abutting surfaces to move the pushed stems against the depressing force of the actuator.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
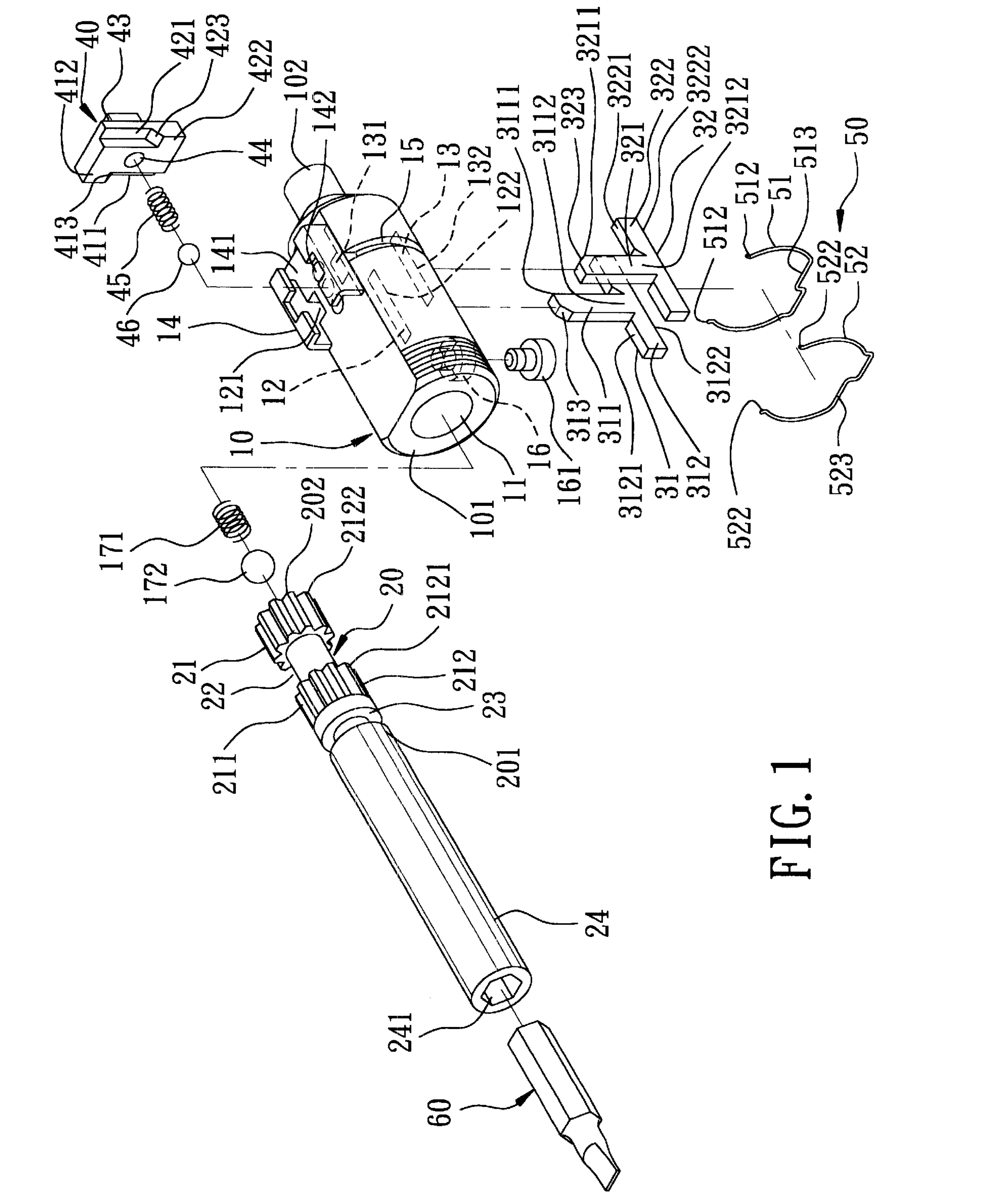
FIG. 1 is an exploded perspective view of a first preferred embodiment a ratchet assembly according to this invention.

Before the present invention is described in greater detail, it should be noted that same reference numerals have been used to denote like elements throughout the specification.

Figure 2:
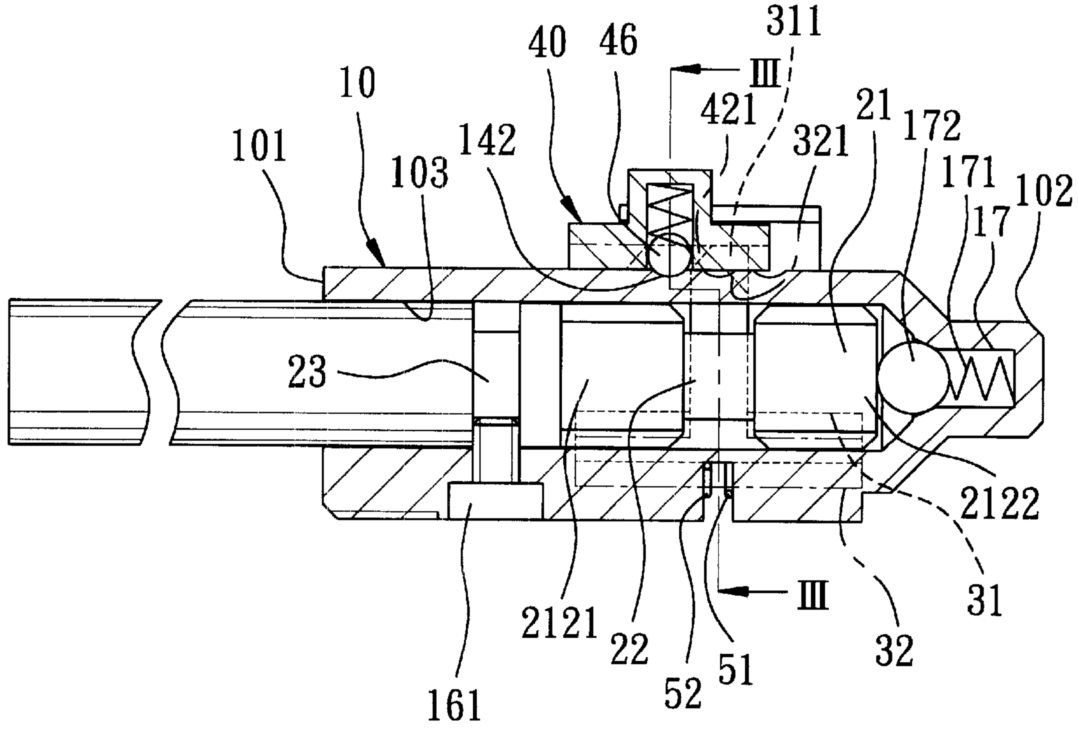
FIG. 2 is a longitudinal sectional view of the first preferred embodiment when shifted in a normal position.

Referring to FIGS. 1 and 2, the first preferred embodiment of the easily direction-convertible ratchet assembly according to the present invention is shown to comprise a mounting body 10, a rotating shaft 20, right and left pawl members 31,32, an actuator 40, and a biasing member 50.

The mounting body 10 includes an opened front portion 101 and a closed rear portion 102 opposite to each other in a longitudinal direction, and an intermediate portion which are interposed therebetween. The front portion 101 includes a front end wall which extends in a first plane facing toward the longitudinal direction, and has an inner tubular hole 11 which extends rearwards into the intermediate portion so as to form an inner surrounding wall surface 103 that surrounds a rotating axis parallel to the longitudinal direction. The inner surrounding wall surface 103 has upper and lower areas opposite to each other in a first transverse direction transverse to the longitudinal direction. The inner tubular hole 11 is divided by a central plane, which passes through the rotating axis and which is parallel to both the longitudinal direction and the first transverse direction, into right and left chambers 12,13. Each of the right and left chambers 12,13 has an upper narrow segment 121,131, and a lower wide segment 122,132. A pin hole 16 is formed through the intermediate portion and extends radial to the axis. A barrier 14 is secured on and cooperates with the mounting body 10 to confine a sliding rail 141 which extends in the longitudinal direction. Three holes 142 are formed in the mounting body 10 and are aligned with one another in the longitudinal direction in the sliding rail 141.

The rotating shaft 20 includes a proximate portion 201 which is formed integrally with a drive shaft 24 with a hexagonal-shaped hole 241 to facilitate insertion of a shank of a hand tool 60, and a distal portion 202 opposite to the proximate portion 201. The distal portion 202 is disposed to be inserted in the inner tubular hole 11 along the rotating axis. An annular slot 23 is formed between the proximate and distal ends 201,202 and is aligned with the pin hole 16 such that a pin 161 can pass through the pin hole 16 to engage the annular slot 23 so as to retain the distal portion 202 of the rotating shaft 20 in the inner tubular hole 11 against movement in the longitudinal direction. A spring 171 and a ball 172 are disposed in an accommodating space 17 which is confined by the distal portion 202 and the rear portion 102. A ratchet wheel 21 is mounted on the distal portion 202 so as to be rotated about the rotating axis. The ratchet wheel 21 includes right and left half tooth portions 211,212 which are respectively located in the right and left chambers 12, 13. Each of the right and left tooth portions 211,212 has front and rear tooth segments 2121,2122 which are spaced apart from each other in the longitudinal direction to confine a recess 22 therebetween.

Right and left pawl members 31,32 are respectively disposed in the right and left chambers 12,13. Each of the right and left pawl members 31,32 includes a pushed stem 311,321 and a pawl body 312,322. The pushed stem 311,321 has an actuated end 3111,3211 which movably extends upwardly and into the upper narrow segment 121,131 and outwardly of the intermediate portion of the mounting body 10 and which has a guiding surface 313,323, and a coupling end 3112,3212 which extends downwardly from the actuated end 3111,3211 in the first transverse direction and through the recess 22. The pawl body 312,322 is disposed on and extends from the coupling end 3112,3212 forwardly and rearwardly to form two portions that correspond to the front and rear toothed segments 2121,2122 of the respective one of the right and left tooth portions 211,212. In addition, the pawl body 312,322 includes a pawl engaging surface 3121, 3221 which is disposed to face upwards and in the first transverse direction and which is movable toward and away from the respective one of the right and left tooth portions 211,212, thereby engaging and disengaging the same, and an abutting surface 3122,3222 opposite to the pawl engaging surface 3121,3221 in the first transverse direction.

The actuator 40 is mounted on the intermediate portion of the mounting body 10 adjacent to the rear portion 102, and is retainingly slidable in the sliding rail 141 in the longitudinal direction. The actuator 40 includes right and left cam surfaces 412,422 which are disposed at two opposite sides of the central plane, and which are respectively proximate to the rear and front portions 102,101, right and left releasing grooves 411, 421 which are aligned respectively with the right and left cam surfaces 412,422 in the longitudinal direction and which respectively extend rearwardly and forwardly, and right and left guiding surfaces 413,423 which are disposed between the right cam surface and releasing groove 412,411 and between the left cam surface and releasing groove 422, 411, respectively. A central recess 44 is formed in the actuator 40 at the central plane such that a biasing member 45 and a ball 46 are received therein to bias the actuator 40 away from the mounting body 10 in the first transverse direction. Thus, the actuator 40 is slidable retainingly along the sliding rail 141 to have the ball 46 engage a selected one of the holes 142 in the mounting body 10. An actuating portion 43 is disposed on the actuator 40 to actuate the sliding movement of the latter.

Figure 3:
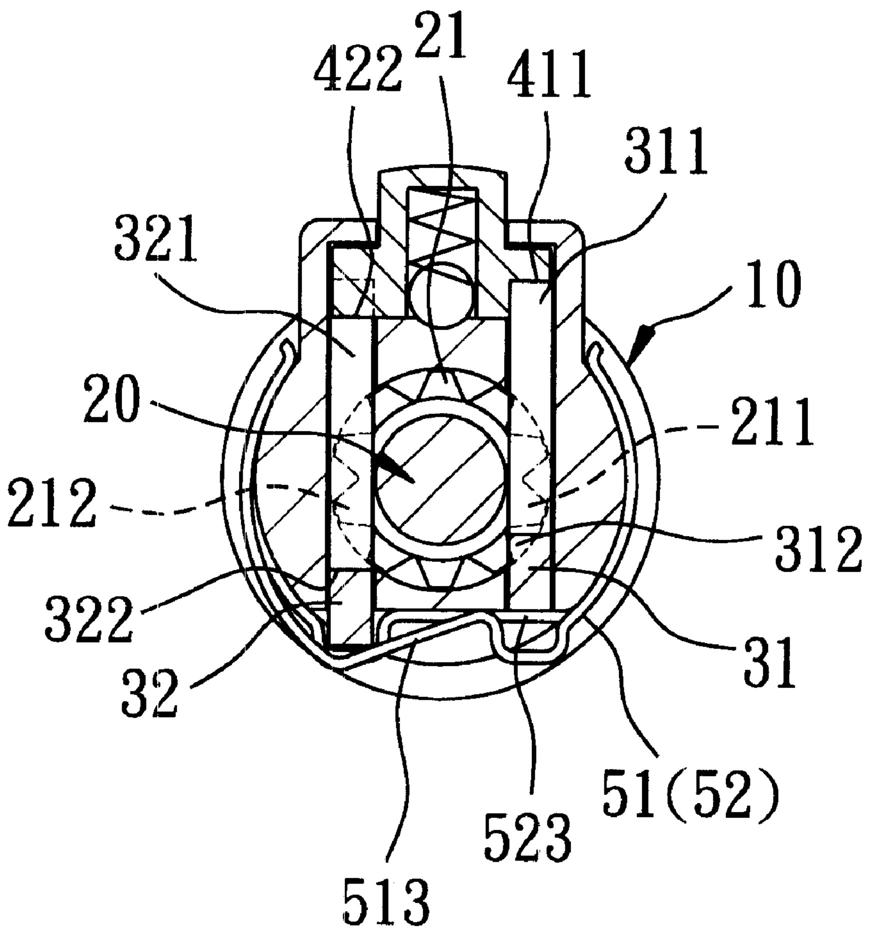
FIG. 3 is a partly cross-sectional view of the ratchet assembly shown FIG. 2, taken along lines III—III thereof.
Figure 5:
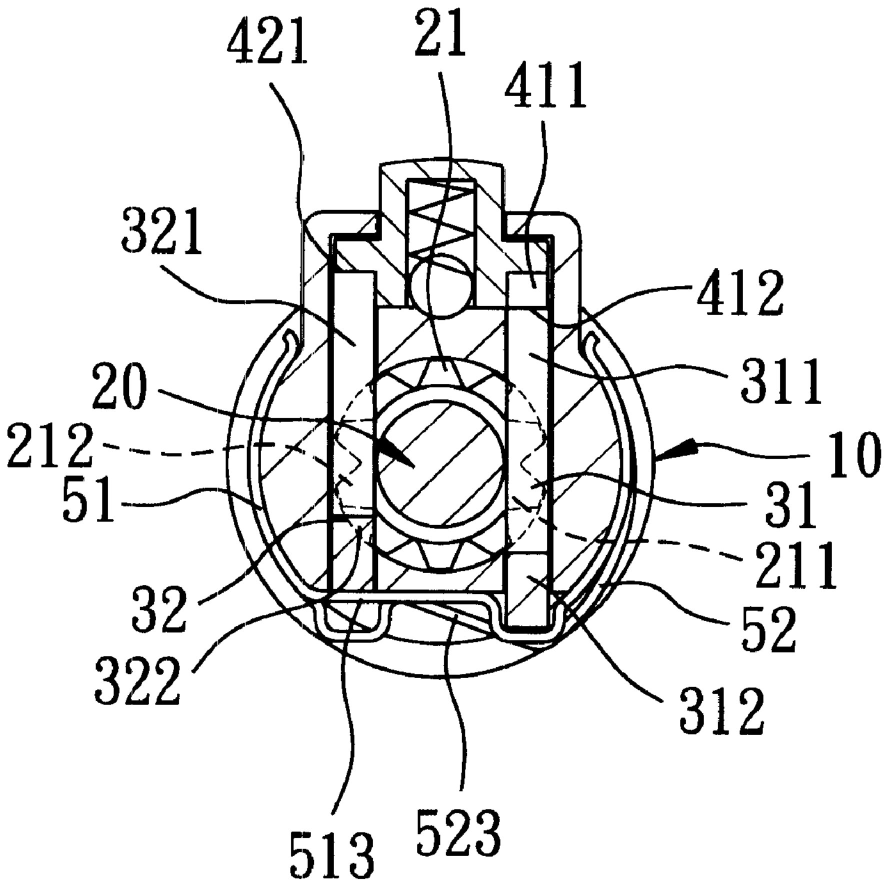
FIG. 5 is a partly cross-sectional view of the ratchet assembly in FIG. 4, taken along lines V—V thereof.

The biasing member 50 includes right and left biasing units 52,51 which are disposed in the inner tubular hole 11 and which are spaced apart from each other in the longitudinal direction. With reference to FIGS. 3 and 5, the right and left biasing units 52,51 respectively include right and left biasing portions 523,513 which are disposed in the right and left chambers 13, 12 respectively underneath the abutting surfaces 3122,3222 so as to bias the pawl engaging surfaces 3121,3221 of the right and left pawl members 312,322 upwardly to engage the right and left tooth portions 211,212, respectively. Each of said right and left biasing units 52,51 has two leg portions 522, 512 which extend along the inner surrounding wall surface 103 from two ends of the respective one of the right and left biasing portions 523,513, and radially and outwardly of the intermediate portion of the mounting body 10 along two grooves 15 such that the leg portions 522,512 are disposed to be spaced apart from and are urged towards each other in a second transverse direction transverse to the longitudinal and first transverse directions so as to be secured to the intermediate portion of the mounting body 10.

As illustrated, referring to FIGS. 2 and 3, when the actuator 40 is moved to a normal position, where the ball 46 is brought to engage the foremost hole 142, the actuator 40 releases the actuated end 3111 of the pushed stem 311 of the right pawl member 31 to permit the pawl engaging surface 3121 of the pawl body 312 to move upwards so as to engage the right tooth portion 211, thereby transmitting a torque force from the rear portion 102 to the right tooth portion 211 so as to turn the rotating shaft 20, as well as the drive shaft 24, in a clockwise direction. On the other hand, the left cam surface 422 of the actuator 40 depresses the actuated end 3211 of the pushed stem 321, against the biasing action of the left biasing unit 51 by means of deformation of the biasing portion 513, to move the respective pawl engaging surface 3221 to disengage the left tooth portion 212 so as not to interfere with the transmission of the torque force.

Figure 4:
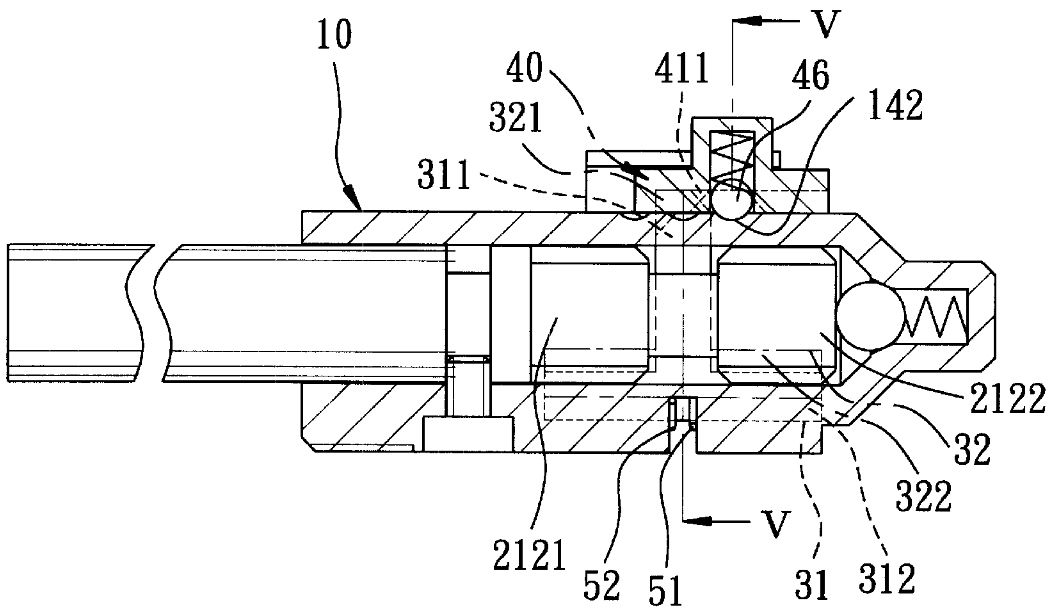
FIG. 4 a longitudinal sectional view of the first preferred embodiment when shifted in a reverse position.

Referring to FIGS. 4 and 5, when the actuator 40 is shifted to a reverse position, where the ball 46 is brought to engage the rearmost hole 142, the actuator 40 releases the actuated end 3211 of the pushed stem 321 of the left pawl member 32 to permit the pawl engaging surface 3221 to move upwards so as to engage the left tooth portion 212, thereby transmitting the torque force from the rear portion 102 to the left tooth portion 212 so as to turn the rotating shaft 20 and the drive shaft 24 in a counterclockwise direction, while the actuated end 3111 is depressed by the right cam surface 412 of the actuator 40, against the biasing action of the right biasing unit 52 by means of deformation of the biasing portion 523, to disengage the right tooth portion 211.

Figure 6:
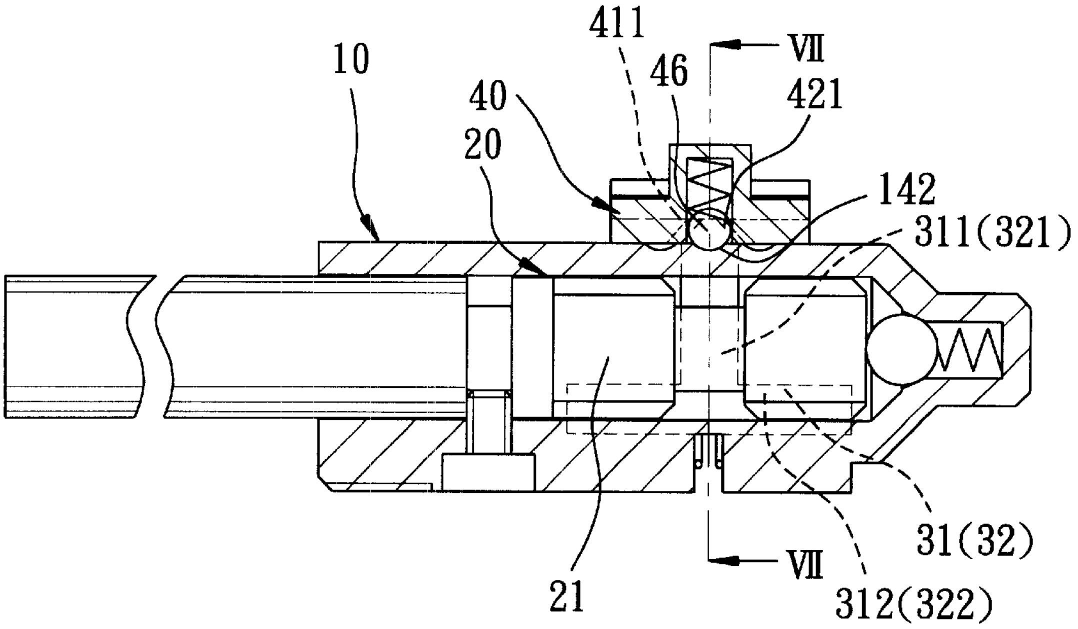
FIG. 6 is a longitudinal sectional view of the first preferred embodiment when shifted in a bi-direction position.
Figure 7:
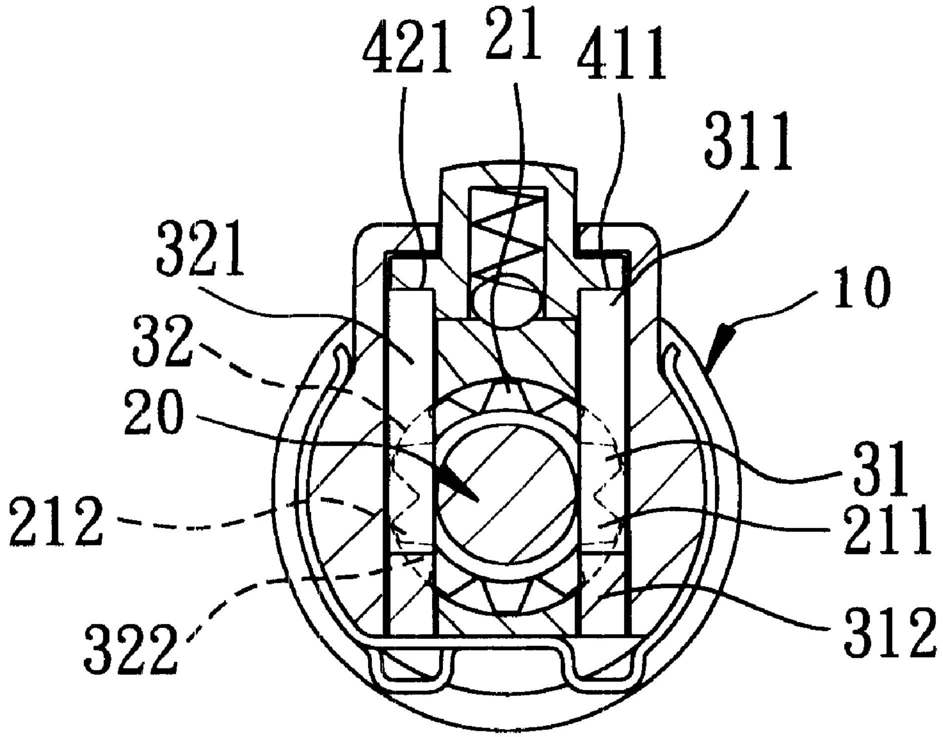
FIG. 7 is a partly cross-sectional view of the ratchet assembly shown in FIG. 6, taken along lines VII—VII thereof.

Referring to FIGS. 6 and 7, when the actuator 40 is shifted to a bi-direction position, where the ball 46 is brought to engage the middle hole 142, the actuator 40 releases both the actuated ends 3111,3211 of the right and left pawl members 31,32 to permit the pawl engaging surfaces 3121,3221 to engage the right and left toothed portions 211,212, thereby permitting transmission of the torque force from the rear portion 102 to the toothed portions 211,212 so as to turn the rotating shaft 20 and the drive shaft 24 in both clockwise and counterclockwise directions.

Moreover, the provision of the guiding surfaces 313,323, 413,423 results in smooth shifting of the actuator 40.

As such, by the engagement of the two portions of the pawl body 312,322 with the respective one of the right and left tooth portions 211,212, the ratchet assembly can provide a larger torsional force. In addition, since the actuator 40 is mounted adjacent to the rear portion 102, the user can operate the actuator 40 with the same hand that is used to grip the rear portion 102, thereby resulting in convenience during shifting of the actuator 40. Moreover, the ratchet wheel 21, the pawl members 31,32 and the biasing member 50 are received in the mounting body 10 so as to result in a more compact size for the whole ratchet assembly.

Figure 8:
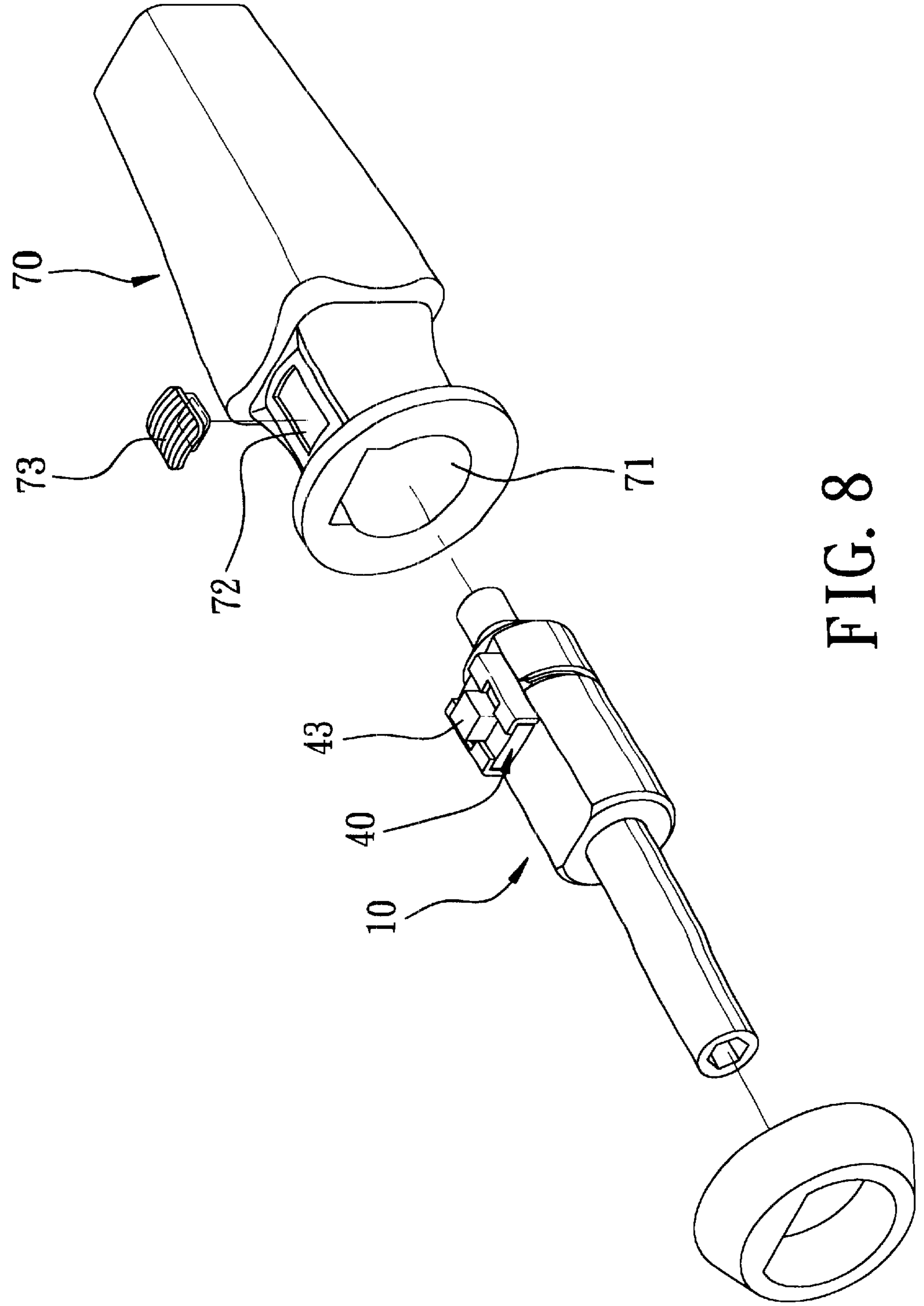
FIGS. 8. and 9 are exploded perspective and sectional views of a second preferred embodiment of a ratchet assembly according to this invention.
Figure 9:
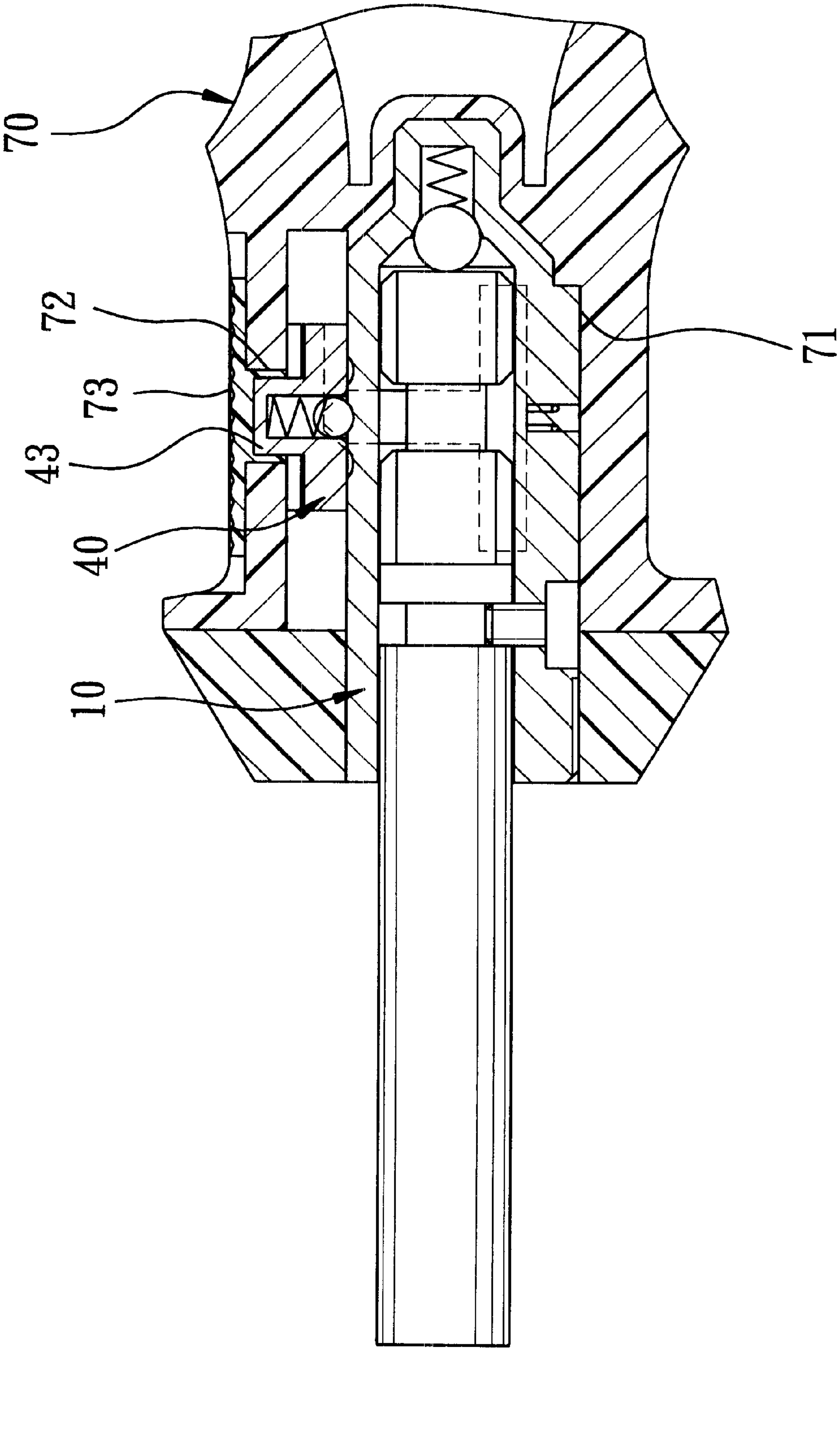
Figure 10:
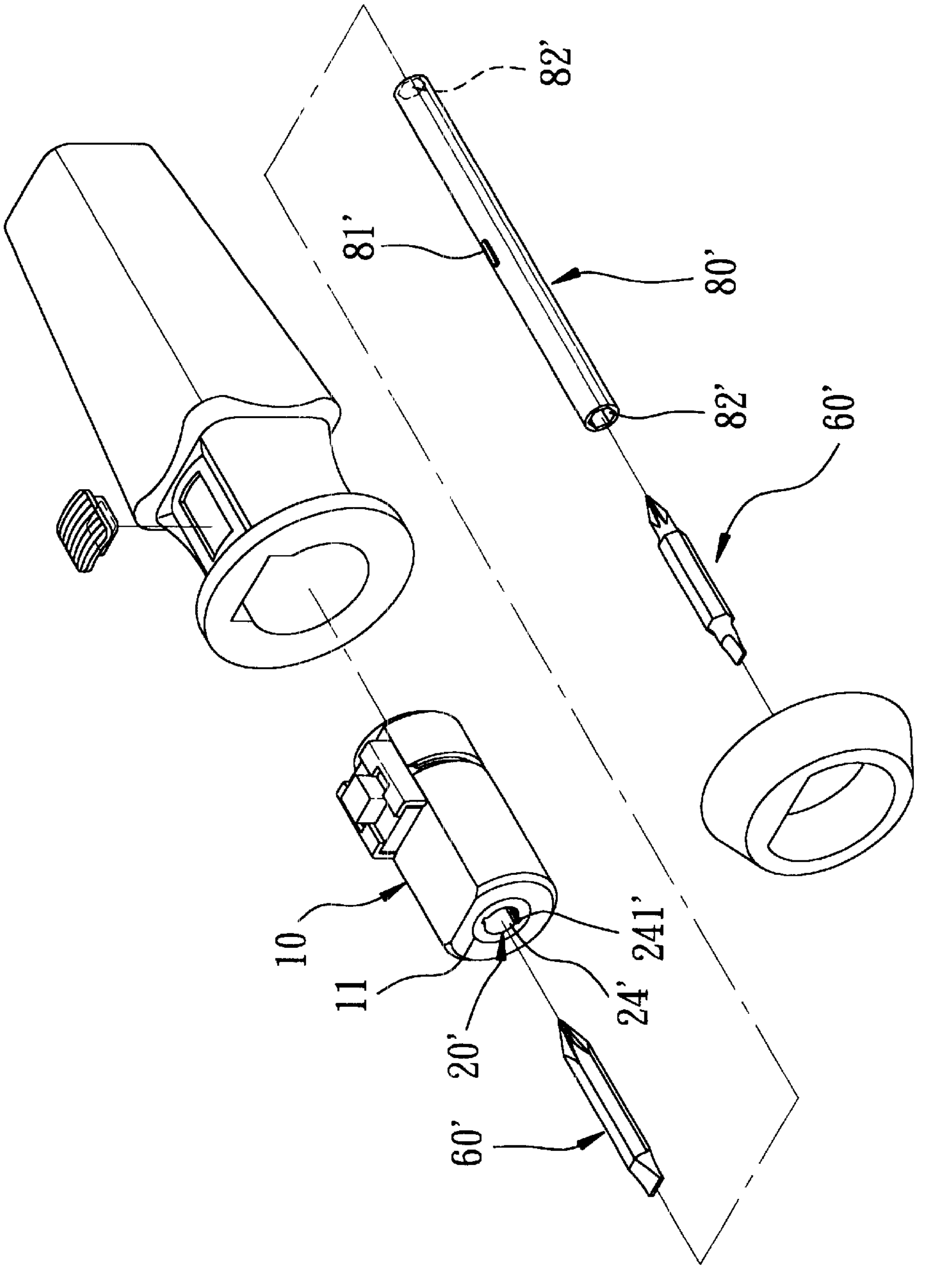
FIG. 10 is an exploded perspective view of a third preferred embodiment of a ratchet assembly according to this invention.

FIGS. 8 and 9 show the second preferred embodiment of the ratchet assembly according to this invention. A handle 70 has a mounting hole 71 to sleeve on the mounting body 10 in which the ratchet wheel, the pawl members and the biasing member (not shown) have been mounted beforehand. An opening 72 is formed in the handle 70 such that the actuating portion 43 on the actuator 40 can project upwardly and outwardly of the handle 70. An operating plate 73 is disposed to cover the actuating portion 43 and is operated to shift the actuator 40 in the manner described beforehand. Referring to FIG. 10, in the third preferred embodiment of the ratchet assembly, the rotating shaft 20' has an axial hole 24' with two diametrically opposite engaging slots 241'. A sleeve 80' is disposed to be inserted into the through hole 24', and has two diametrically opposite engaging blocks 81' which are formed on an outer surrounding wall thereof so as to engage respectively the engaging slots 241' to rotate with the rotating shaft 20'. The sleeve 80' further has two hexagonal-shaped holes 82' which are formed in two ends so as to insert detachably two hand tools 60' of different configurations.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An easily direction-convertible ratchet assembly adapted for use in a hand tool which has a handle and a drive shaft, said ratchet assembly comprising:

a mounting body including front and rear portions opposite to each other in a longitudinal direction, and an intermediate portion interposed therebetween, said rear portion being adapted to be secured to and being rotatable with the handle when the handle is turned by a torque force, said front portion including a front end wall extending in a first plane facing toward the longitudinal direction, and having an inner tubular hole extending rearwards into said intermediate portion so as to form an inner surrounding wall surface which surrounds a rotating axis parallel to the longitudinal direction, said inner surrounding wall surface having upper and lower areas opposite to each other in a first transverse direction transverse to the longitudinal direction, said inner tubular hole being divided by a central plane, which passes through the rotating axis and which is parallel to both the longitudinal direction and the first transverse direction, into right and left chambers;

a rotating shaft adapted to be rotated with the drive shaft about the rotating axis, and including proximate and distal portions relative to the drive shaft, said distal portion being disposed to be inserted in said inner tubular hole along the rotating axis;

a ratchet wheel mounted on said distal portion so as to be rotated about the rotating axis, said ratchet wheel including right and left half tooth portions respectively located in said right and left chambers;

right and left pawl members respectively disposed in said right and left chambers, each of said right and left pawl members including a pushed stem having an actuated end movably extending upwardly and into said upper area and outwardly of said intermediate portion, and a coupling end extending downwardly from said actuated end in the first transverse direction, and a pawl body disposed on said coupling end, and including a pawl engaging surface disposed to face upwards and in the first transverse direction and movable toward and away from a respective one of said right and left tooth portions, thereby engaging and disengaging the same, and an abutting surface opposite to said pawl engaging surface in the first transverse direction;

an actuator mounted on and shiftable relative to said mounting body between a normal position, where said actuator releases one of said actuated ends of said pushed stems of said right and left pawl members to permit said pawl engaging surface of a respective one of said pawl bodies to move upwards so as to engage a respective one of said right and left tooth portions, thereby transmitting the torque force from said rear portion to the respective one of said right and left tooth portions so as to turn said rotating shaft in a clockwise direction, while said actuator depresses the other one of said actuated ends of said pushed stems to move the respective one of said pawl engaging surfaces to disengage the other one of said right and left tooth portions so as not to interfere with the transmission of the torque force via the engagement of said one of said actuated ends, and a reverse position, where said actuator releases the other one of said actuated ends of said pushed stems of said right and left pawl members to permit the respective one of said pawl engaging surfaces to move upwards so as to engage the other one of said right and left tooth portions, thereby transmitting the torque force from said rear portion to said other one of said right and left tooth portions so as to turn said rotating shaft in a counterclockwise direction, while said one of said actuated ends is depressed by said actuator; and a first biasing member disposed to bias a respective one of said abutting surfaces to move a respective one of said pushed stems against the depressing force of said actuator.

2. The ratchet assembly of claim 1, wherein each of said right and left tooth portions has front and rear tooth segments spaced apart from each other in the longitudinal direction to confine a recess therebetween so as to permit said pushed stem of the respective one of said right and left pawl members to pass through in the first transverse direction, said pawl body of each of said right and left pawl members including two portions which respectively extend forwardly and rearwardly from said coupling end such that when the respective one of said actuated ends is released, said two portions will be moved to engage respectively said front and rear toothed segments.

3. The ratchet assembly of claim 2, wherein said first biasing member includes right and left biasing units which are disposed in said inner tubular hole and which are spaced apart from each other in the longitudinal direction, said right and left biasing units respectively including right and left biasing portions disposed in said right and left chambers respectively underneath said abutting surfaces so as to bias said pawl engaging surfaces of said right and left pawl members upwardly to engage said right and left tooth portions, respectively.

4. The ratchet assembly of claim 3, wherein each of said right and left biasing units has two leg portions extending along said inner surrounding wall surface from two ends of a respective one of said right and left biasing portions, and radially and outwardly of said intermediate portion such that said leg portions are disposed to be spaced apart from and are urged towards each other in a second transverse direction transverse to the longitudinal and first transverse directions so as to be secured to said intermediate portion.

5. The ratchet assembly of claim 3, wherein said actuator is movable in the longitudinal direction to be shifted between the normal and reverse positions.

6. The ratchet assembly of claim 5, wherein said actuator is mounted on said intermediate portion adjacent to said rear portion, and is shifted between said actuated ends of said pushed stems of said right and left pawl members.

7. The ratchet assembly of claim 6, wherein said actuator includes right and left cam surfaces disposed at two opposite sides of the central plane, and respectively proximate to said rear and front portions such that in the normal position, said left cam surface is brought to depress said actuated end of said left pawl member downwardly, against the biasing action of said left biasing portion, to disengage said left tooth portion, and in the reverse position, said right cam surface is brought to depress said actuated end of said right pawl member downwardly, against the biasing action of said right biasing portion, to disengage said right tooth portion.

8. The ratchet assembly of claim 7, further comprising:

a second biasing member disposed between said actuator and said mounting body to bias said actuator away from said mounting body in the first transverse direction; and a barrier secured on and cooperating with said mounting body to confine a sliding rail which extends in the longitudinal direction such that said actuator is retainingly slidable along said sliding rail to shift between the normal and reverse positions.

9. The ratchet assembly of claim 1, wherein said proximate portion of said rotating shaft is formed with a hexagonal-shaped hole adapted for engagement of the drive shaft.

* * * * *